United States Patent [19]

Ferrell et al.

[11] 4,415,386

[45] Nov. 15, 1983

[54] METHOD AND APPARATUS FOR ASSEMBLING AND ATTACHING ZIPPER CLOSURE STRIPS TO SACKS

[75] Inventors: Robert A. Ferrell, Shelbyville, Ind.; James A. Robinette, Bristol, Tenn.

[73] Assignees: KCL Corporation, Shelbyville, Ind.; Strong-Robinette Company, Inc., Bristol, Tenn.

[21] Appl. No.: 348,210

[22] Filed: Feb. 12, 1982

[51] Int. Cl.[3] .............................................. B32B 31/00

[52] U.S. Cl. .......................................... 156/64; 53/51; 156/363

[58] Field of Search ............................... 156/353-355, 156/361-364; 226/27-33; 53/51

[56] References Cited

U.S. PATENT DOCUMENTS

| | | | |
|---|---|---|---|
| 3,294,301 | 12/1966 | Richter | 226/27 |
| 3,782,305 | 1/1974 | Robinette | 112/10 |
| 4,239,570 | 12/1980 | Kerwin | 156/363 X |
| 4,241,865 | 12/1980 | Ferrell | 229/62 |

*Primary Examiner*—David A. Simmons
*Attorney, Agent, or Firm*—Hill, Van Santen, Steadman & Simpson

[57] ABSTRACT

Apparatus and method for assembling and attaching zipper closure means in strip form to open ends of flat sacks fed serratim into an attachment station. Consecutive sections of the closure means must be in proper registration with the sacks in such station. Assembly of the sections with the sack ends is coordinated by monitoring relative orientation of the sections and the sacks and automatically correcting for deviations from the registration.

14 Claims, 6 Drawing Figures

METHOD AND APPARATUS FOR ASSEMBLING AND ATTACHING ZIPPER CLOSURE STRIPS TO SACKS

This invention relates to a new and improved method and apparatus for assembling and attaching zipper closure strips to sacks.

More particularly, the present invention is directed to producing in apparatus as disclosed in U.S. Pat. No. 3,782,305, reclosable shipping sacks of the kind disclosed in U.S. Pat. No. 4,241,865. Both of these patents are incorporated herein by reference to any extent necessary for complete understanding of the present invention.

The apparatus and method disclosed in U.S. Pat. No. 3,782,305 has proved quite successful for providing bags or sacks with sewed-on closures of the type in which a sewing thread is adapted to be ripped free for opening the sack. For this purpose, flat sacks are fed along a path serriatim in predetermined spaced side-by-side relation and a continuous paper strip is folded over aligned ends of the sacks and stitched in place. The stitched closure strip is severed in the space between each successive sack. No particular care need be taken with respect to longitudinal orientation of the strip with the sack ends because the closure strip is identical along its entire length. Actuation of a cutter is coordinated with continuous movement of the sacks with closure strips attached to attain substantially centered severance of the strip between sacks.

Having regard to U.S. Pat. No. 4,241,865, the closure strips have been substantially modified to equip the same with zipper means for enabling reclosing of the sacks, as distinguished from the removable closure strips as disclosed in connection with the sacks in U.S. Pat. No. 3,782,305. In the latter instance, once the closure strips have been opened, they are released from the sacks and the sacks remain open.

The desirability of utilizing the apparatus of U.S. Pat. No. 3,782,305 for equipping sacks with zipper closure means according to U.S. Pat. No. 4,241,865 is readily apparent. However, a serious problem has been encountered in that the zipper closure requires a reasonably accurate registration of sections of the strip carrying individual zipper sliders which must be limited in their zipper opening and closing range of movement to substantially the width of the associated sack. For satisfactory functioning of the zipper closure, there should be little if any deviation from proper registration of the zipper section of the closure strip with respect to the sack width.

Unavoidable variables in machine operation have made it virtually impossible to apply the zipper equipped closure strip in accordance with the teachings of U.S. Pat. No. 4,241,865 by means of the machine as disclosed in U.S. Pat. No. 3,782,305, and it is to the alleviation of this problem that the present invention is directed.

Accordingly, it is an important object of the present invention to adapt the machine and method substantially as disclosed in U.S. Pat. No. 3,782,305 for equipping bags with zipper closures as taught in U.S. Pat. No. 4,241,865.

To this end, the present invention provides in apparatus for assembly and attachment of zipper closure means in strip form to the open ends of flat sacks fed serratim into an attachment station, and wherein consecutive sections of said closure means must be in proper registration with the sacks in said station, the improvement comprising means for coordinating assembly of said sections with said sack ends, and including a device for monitoring relative orientation of said sections and said sacks and for automatically correcting for deviations from said registration.

The invention also provides a method of assembling and attaching zipper closure means in strip form to the open ends of flat sacks fed serratim into an attachment station, and wherein consecutive sections of said closure means must be in proper registration with the sacks in said station, the improvement comprising coordinating assembly of said sections with said sack ends, and including monitoring relative orientation of said sections and said sacks and automatically correcting for deviations from said registration.

Other objects, features and advantages of the invention will be readily apparent from the following description of a representative embodiment thereof, taken in conjunction with the accompanying drawings, although variations and modifications may be effected without departing from the spirit and scope of the novel concepts embodied in the disclosure and in which:

FIG. 1 is a side elevational view of a machine operating on the principles of the machine disclosed in U.S. Pat. No. 3,782,305 but embodying the present invention;

Figures 1, 2, 3:
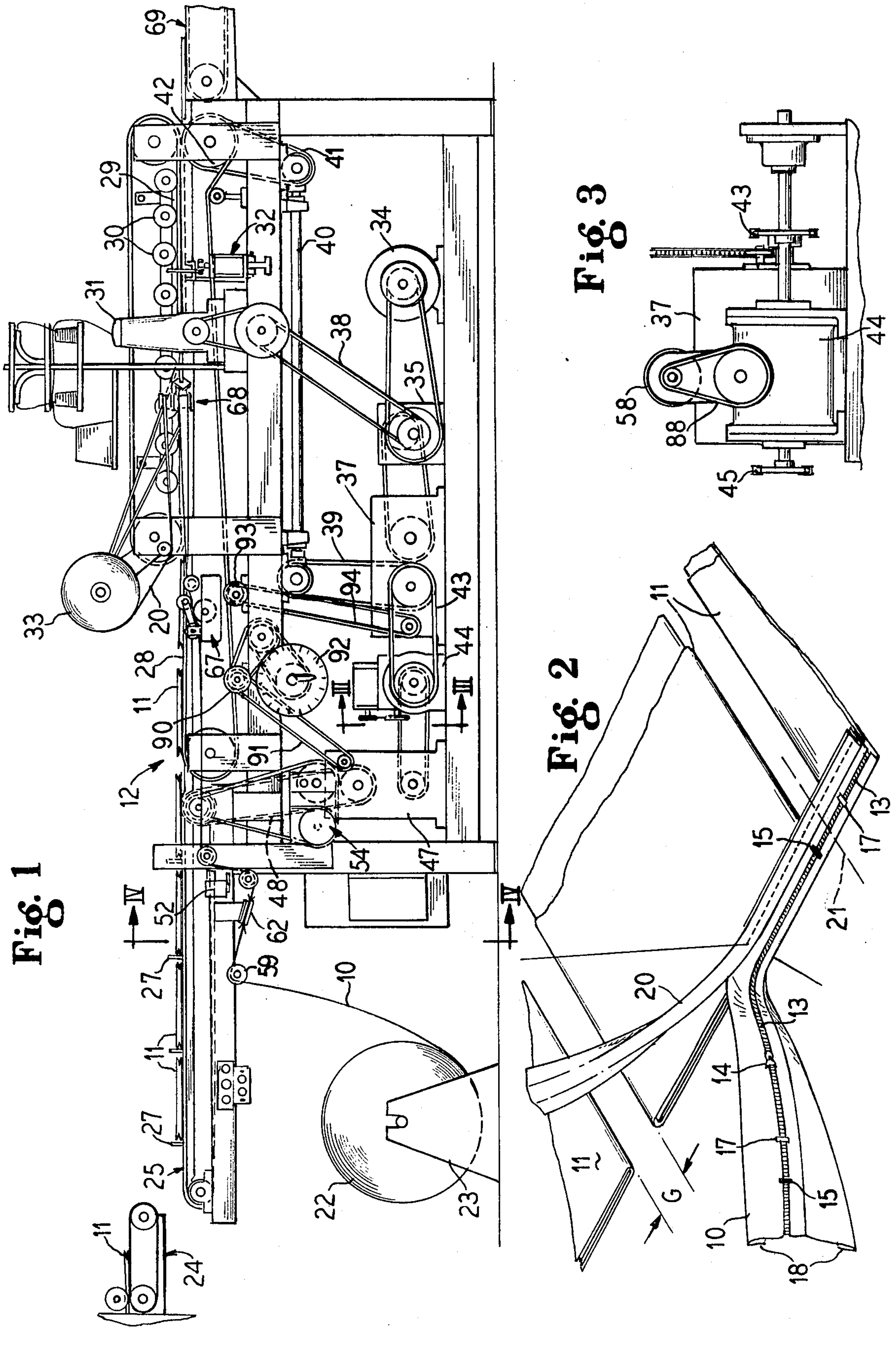
FIG. 2 is a schematic elevational view demonstrating the manner in which the zipper closure strip is assembled and attached to the sacks.
FIG. 3 is a fragmentary sectional elevational view taken substantially along the line III—III in FIG. 1.

Referring to FIGS. 1 and 2, zipper closure means in a continuous strip 10 is adapted to be assembled with and attached to the open ends of folded flat sacks 11 fed along a path serriatim in side-by-side relation in apparatus 12, sometimes herein also referred to as the machine.

A salient characteristic of the closure strip 10 is that it is equipped with a succession of as nearly as practicable identical zipper sections 13, each of which has the usual slider 14 for opening and closing the zipper. At one end of each section is located a slider terminal stop 15, and at the opposite end of each section is a slider terminal stop 17. This construction is substantially the same as in the aforesaid U.S. Pat. No. 4,241,865 except that instead of the zipper being provided with stringers attached to paper strips, in this instance the zipper is prefabricated directly onto the paper strip along each side of the zipper and which paper strip is of desired differential width at each side to accommodate facing of the zipper toward one preferred side of the sack to which the zipper is to be attached. Each zipper section 13 is registered with the end of the bag to which it is to be attached in folded condition with adhesive 18 securing the opposite marginal portions of the strip 10 to the respective opposite margins of the sack end. This provides a reclosable zipper closure for the sack. In addition, a chain stitch fastener 19 is provided, with a paper filler cord or rip tape 20 secured by the top thread of the chain stitching 19. This provides security against spilling of contents from the sack before it is desired to use the contents. After the chain stitching 19 has been released, the zipper closure can be manipulated to open and reclose the sack. After the closure means has been secured to each successive sack 11, it is separated from the series of sacks by severing the closure strip 10 along a line 21 between the sack to be separated and the next adjacent sack. Desirably, such severance line 21 is effected as nearly as practicable medially relative to a space or gap G of predetermined width between the adjacent sacks. This leaves a preferred length of extension of the closure strip extending from the respective sides of the adjacent sacks.

Figure 4:
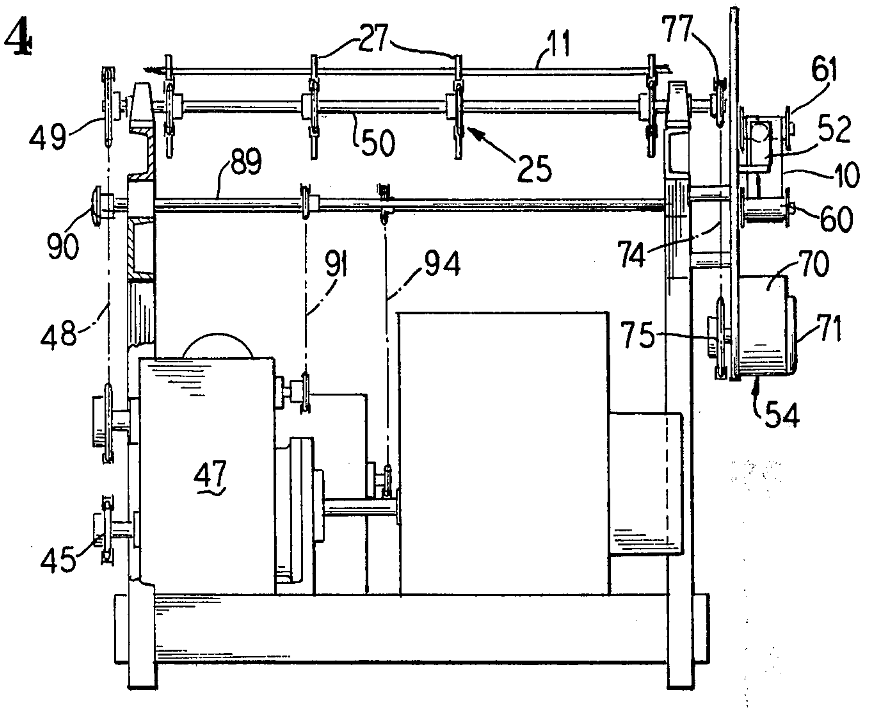
FIG. 4 is a vertical sectional elevational view taken substantially along the line IV—IV in FIG. 1.

In the machine 12, all of the steps just described are adapted to be carried out continuously and automatically. To this end, the prefabricated zipper strip 10 is supplied from a roll 22 which may be carried freely rotatably by a stand 23. The folded sacks 11 are supplied from a source 24 to an infeed conveyor 25 provided with upwardly extending feed lugs and which delivers the flattened sack blanks 11 to a work feed conveyor system comprising an endless carrying conveyor 28 which transports the sacks in the desired predetermined spaced relationship to and under a free wheeling endless hold down conveyor 29 equipped with idler pressure wheels or rollers 30. At the desired location a sewing head 31 is carried by the machine frame, and downstream therefrom is mounted a shearing device 32. The rip strip 20 is supplied from a roll or reel 33 suitably mounted on the machine frame upstream from the sewing head 31. Means for powering the machine 12 comprise an electrical motor 34 operating through a gear box 35 and variable speed transmission 37. An endless driving element 38 actuated through the gear box 35 drives the sewing head 31. A power train including an endless driving element 39, an endless driving element 41 and a pulley 42 provide a drive from the variable transmission 37 for the endless conveyor 28. Power for driving the feed-in conveyor 25 is derived from the variable transmission 37 by way of an endless driving element 43 connected to a differential 44 which is in turn connected by means of an endless driving element 45 to a transmission 47. An endless driving element 48 (FIGS. 1 and 4) is trained from the transmission 47 to and over a drive pulley 49 on a driveshaft 50 for the conveyor 25. Operation of the severing device 32 may be effected in proper timed sequence electropnuematically as more particularly disclosed in U.S. Pat. No. 3,782,305.

For satisfactory functioning of each zipper section 13 on the sack 11 to which attached, it is important that the section 13 be as nearly as practicable properly registered with the sack mouth, even though there may be some tolerance variables in the prefabricated strip 10, and operating tolerance variables may be experienced from time to time in the operation of the machine 12. The problem of attaining proper registration has been addressed and met by the present invention, and comprises coordinating assembly of the sections 13 with the sack ends, namely the mouth ends, and including monitoring relative orientation of the sections and the sacks and automatically correcting for deviations from the proper registration.

Figure 5:
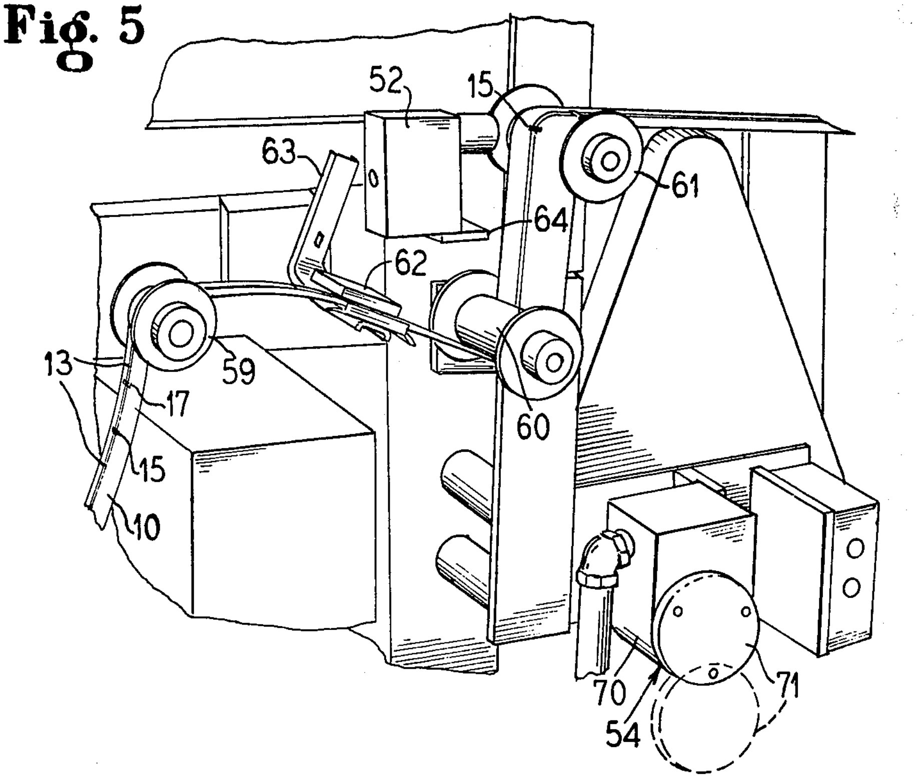
FIG. 5 is a fragmentary elevational view showing a closure means strip section sensor which is part of a monitoring device of the apparatus.
Figure 6:
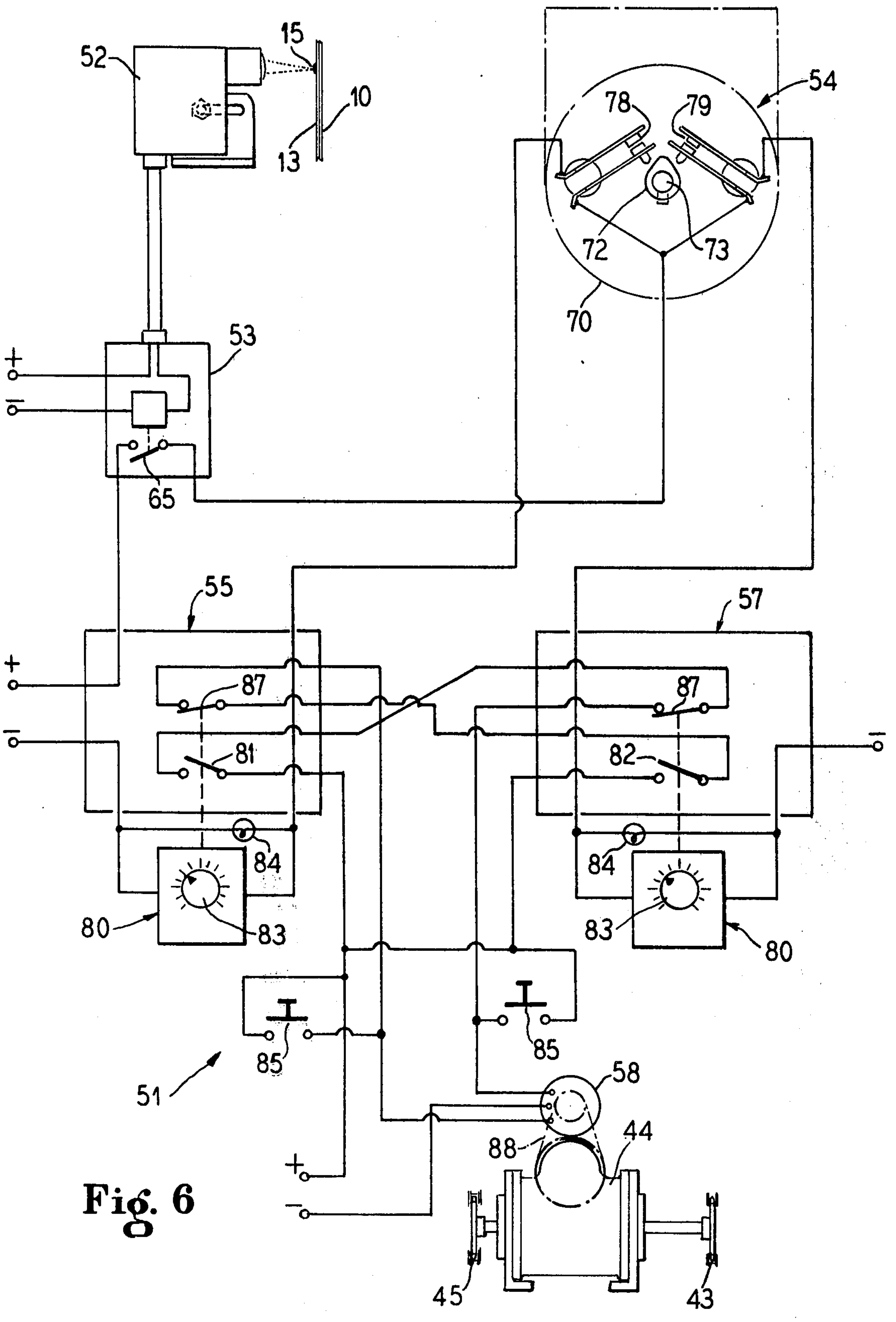
FIG. 6 is a schematic view of various elements and electrical circuitry involved in the monitoring and deviation correcting device for the apparatus.

The means for coordinating assembly of the sections 13 with the ends of the sacks 11 comprises not only already described components of the machine, but also includes what is herein broadly designated a device 51 (FIG. 6) for monitoring relative orientation of the sections 13 and the sacks 11 and for automatically correcting for deviations from the desired registration of the sections relative to the sacks. Cooperative components of the device 51 comprise a sensor desirably in the form of an electric eye 52 (FIGS. 1, 5 and 6) which is trained on the zipper strip 10 and more particularly the zipper sections 13, an electric eye relay 53, a selector switch 54, time delay relays 55 and 57, and a correction motor 58 which controls the differential 44.

For reading thereof by the electric eye 52, the zipper strip 10 is trained from the roll 22 over a guide roller or pulley 59 from which the strip passes under a guide roller pulley 60 and then up and over a guide roller pulley 61 adjacent to the level of the conveyor 28. For maintaining the strip 10 substantially centered without any significant lateral deviations while passing through the guide pulley system, centering guide shoe means 62 mounted by means of a bracket 63 on the machine frame has the strip 10 threaded therethrough in the span between the guide pulleys 59 and 60. For scanning the zipper sections 13, the electric eye 52 is desirably mounted as by means of a bracket 64 carried by the machine frame and located so that the eye is focused on the zipper at the onrunning side of the upper guide pulley 61, as best visualized in FIG. 5. Conveniently, one of the stops 15 or 17 and in this instance the stop 15 of each of the zipper sections 13 is devised to provide indicia identifiable by the electric eye sensor 52. For example, each of the stops 15 may be dark color, e.g., black, while the remainder of each of the zipper sections may be of neutral coloration, such as white, so that the focused electric eye will only read each of the stops 15 and ignore the remainder of the zipper. As the indicia spot stop 15 on the continuously running zipper strip 10 is detected by the electric eye 52, the electric eye reacts to activate the relay 53 which momentarily closes a normally open switch 65 in the electrical control circuit of the device 51.

From the electric eye station, the zipper strip travels from the guide pulley 61 to and through an adhesive applicator 67 (FIG. 1) where the stripes of adhesive 18 are applied. Downstream beyond the adhesive applicator 67, the zipper strip passes to and through folding means 68 which folds the strip about the mouth ends of the flat sacks 11. The assembly of zipper strip and sacks then pass through the sewing head 31, whereafter the assembly moves on and each successive zipper equipped sack is separated by severance of the portion of the zipper strip which connects it to the next succeeding sack, by operation of the cutoff shear 32 and the separated sack is delivered to a take away conveyor 69.

In a desirable arrangement, the selector switch 54 is of dual point type mounted within a housing 70 (FIGS. 4 and 5) having an access cover 71 which is adapted to be opened for access to the interior of the housing, as for example, for effecting adjustments of a switch tripping cam 72 (FIG. 6) mounted on a rotary shaft 73 which is driven by an endless driving member 74 trained about a driven pulley or sprocket 75 fixed on the shaft 73 and a driving pulley or sprocket 77 fixed on the conveyor shaft 50. Through this arrangement, the switch cam 72 is coordinated in cyclical operation with the conveyor 25. In each rotary cycle of the cam 72, it successively closes normally open advance switch points 78 and normally open retard switch points 79. If the cam 72 is in a neutral position between the switch points 78 and 79 at the moment the electric eye controlled relay switch 65 is closed, the electrical control system remains inactive because proper registration of the zipper sections relative to the advancing bags is indicated.

If either set of selector switch points 78 or 79 is closed when the electric eye 52 reads the black zipper stop 15, an electric circuit is closed through a respective external switch 80 of the time delay relay to which the closed switch points are operationally connected. For example, if the advance contacts 78 are closed, the time delay relay 55 will be activated to close normally open contacts 81 and thus signal the correction motor 58 to operate the differential 44 for advancing the conveyor 28 by a suitable increment. By the same token, if the retard contacts 79 are closed, the time delay relay 57 is activated by closing of normally open contact points or switch 82 which signals the correction motor 58 to actuate the differential for retarding advance of the conveyor 28 by a suitable increment. Running of the correction motor 58 in either direction may be set through adjustment means 83 of the respective timing control switch 80 to be from ½ to about 3 seconds depending upon optimally determined conditions as gained from experience. Activation of either of the time delay relays 55 and 57 is adapted to be visualized by means of respective signal lamps 84. When it is desired to effect initial or major adjustments, either of respective jogging switches 85 may be operated for advancing or retarding the conveyor 28, to attain the desired adjustment. When either of the relay contact switches 81 or 82 is closed, a respective contact switch 87 is opened to assure inactivity of the other time delay relay in each instance. This avoids any tendency of the correction motor 58 from trying to run both ways at the same time.

Conveniently, the correction motor 58 has a driving coupling with the differential 44 provided through an endless driving member 88 (FIG. 3).

For manually adjusting the machine for different widths of the sacks 11, in similar manner as described in U.S. Pat. No. 3,782,305, a shaft 89 is adapted to be manually rotated as by means of a knob 90 (FIG. 4) for controlling the transmission 47 through an endless driving member 91. The width adjustment is adapted to be visualized on a dial 92. Also, similarly as described in U.S. Pat. No. 3,782,305, a knob 93 is adapted to be manually operated for driving an endless driving element 94 for controlling the variable speed transmission 37.

It will be understood that variations and modifications may be effected without departing from the spirit and scope of the novel concepts of this invention.

I claim as my invention:

1. Apparatus adapted for assembling and attaching, in an attachment station thereof, zipper closure means in strip form to the open ends of folded flat sacks, and wherein consecutive sections of said closure means, each having a zipper slider and slider stop means, must be in proper registration with said sack ends in said attachment station and with said slider stop means generally aligned with the sides of said open ends, and comprising:

means for feeding said sections seriatim through said attachment station;

means for delivering said zipper closure means along a path and section-by-section into assembly with said open ends of said sacks in said attachment station;

and monitoring means located along said path for sensing said slider stop means and for detecting and automatically correcting deviations from said proper registration.

2. Apparatus according to claim 1, wherein said feeding means includes a sack feed conveyor, means for driving said conveyor, a differential connected with said conveyor driving means, a correction motor for controlling said differential, and electrical circuitry signalled by said sensing means for operating said correction motor.

3. Apparatus according to claim 1, comprising a machine wherein said feeding means is a feed conveyor which transports said folded flat sacks to and through said attachment station, means for supplying the closure means strip, means for guiding said strip along said path from said supplying means to said attachment station, means for driving said conveyor, and said monitoring means including means for controlling said driving means.

4. Apparatus according to claim 3, wherein said monitoring means comprises an electric eye scanner for reading one of said slider stop means stops serving as a control indicia.

5. Apparatus according to claim 2, wherein said electrical circuitry comprises respective advance and retard time delay relays and selector switch means cooperatively related to said sensing means for controlling operation of said relays.

6. Apparatus according to claim 4, wherein said driving means includes a differential and a reversable controlling motor for controlling the differential, and electrical circuitry controlled by said monitoring means.

7. Apparatus according to claim 6, wherein said electrical circuitry comprises a selector switch having dual advance and retard contacts, and a cam rotatably driven from a rotary shaft which comprises part of said conveyor and the cam cyclically operating said contacts.

8. Apparatus according to claim 7, wherein said electrical circuitry includes time delay relays connected with said contacts and with said motor.

9. A method of assembling and attaching to the open ends of folded flat sacks sections of zipper closure means in strip form, and wherein each of said sections has a zipper slider and slider stop means, and comprising:

feeding said sacks seriatim through an attachment station;

delivering said zipper closure means along a path and section-by-section into assembly with said open ends of the sacks in said attachment station;

and monitoring said sections along said path by sensing said slider stop means and detecting deviations from proper registration of said sections with said sack ends and automatically correcting such deviations.

10. A method according to claim 9, which comprises equipping one slider stop of said slider stop means of each of said sections with an identifiable indicia, and effecting said sensing by reading said indicia.

11. A method according to claim 9, which comprises feeding said flat sacks on a feed conveyor, and in response to said monitoring retarding or advancing feeding movement of said conveyor to maintain said registration.

12. A method according to claim 11, which comprises driving said conveyor through means including a differential, controlling said differential by means of a reversible motor, and controlling said reversible motor by said monitoring.

13. A method according to claim 9, comprising supplying on each of said sections one zipper stop having a color differentiated from the remainder of a zipper on said section, and effecting said sensing by reading said differentially colored zipper stops.

14. A method according to claim 13, wherein said flat sacks are fed on a sack feeding conveyor, and by said sensing detecting deviations in orientation of the sacks on the conveyor with respect to said closure means sections fed thereto, and effecting said correcting for deviations by retarding or advancing the conveyor.

* * * * *